(12) United States Patent
Urushiya

(10) Patent No.: US 8,121,381 B2
(45) Date of Patent: Feb. 21, 2012

(54) X-RAY IMAGE PROCESSING APPARATUS AND METHOD

(75) Inventor: Hiroyuki Urushiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 12/392,991

(22) Filed: Feb. 25, 2009

(65) Prior Publication Data

US 2009/0214100 A1    Aug. 27, 2009

(30) Foreign Application Priority Data

Feb. 26, 2008  (JP) ................................ 2008-043778

(51) Int. Cl.
*G06K 9/00* (2006.01)

(52) U.S. Cl. ...................................................... 382/132

(58) Field of Classification Search .................. 382/128, 382/132
See application file for complete search history.

(56) References Cited

U.S. PATENT DOCUMENTS

| 2005/0265606 | A1* | 12/2005 | Nakamura | 382/218 |
|---|---|---|---|---|
| 2007/0019853 | A1* | 1/2007 | Luo | 382/132 |
| 2009/0034819 | A1* | 2/2009 | Nord et al. | 382/132 |
| 2009/0141958 | A1* | 6/2009 | Graumann et al. | 382/132 |

FOREIGN PATENT DOCUMENTS

| JP | 11-151232 A | 6/1999 |
|---|---|---|
| JP | 2000-101840 A | 4/2000 |
| JP | 2000-163562 A | 6/2000 |
| JP | 2002-282244 A | 10/2002 |
| JP | 2002-330953 A | 11/2002 |
| JP | 2003-016449 A | 1/2003 |

\* cited by examiner

*Primary Examiner* — Roy M Punnoose
(74) *Attorney, Agent, or Firm* — Canon USA, Inc., I.P. Division

(57) ABSTRACT

An X-ray image processing apparatus includes a site information determination unit configured to determine, based on discrete site information, continuous site information to be obtained by radiographing a moving image, an information acquisition unit configured to extract, from the discrete site information, image construction information, image processing method information, and X-ray exposure control method information, a computation unit configured to compute processing information about a site located between positions represented by the discrete site information using the information extracted by the information acquisition unit, an image processing unit configured to perform image processing based on the processing information which is computed by the computation unit, and an X-ray exposure control unit configured to perform X-ray exposure based on the processing information which is computed by the computation unit.

7 Claims, 11 Drawing Sheets

RADIOGRAPHED SITES IN CASE OF RADIOGRAPHING WHOLE BODY

RADIOGRAPHED SITES IN CASE OF RADIOGRAPHING HEAD

RADIOGRAPHED SITES IN CASE OF RADIOGRAPHING THORACOABDOMINAL REGION

RADIOGRAPHED SITES IN CASE OF RADIOGRAPHING LOWER BODY

RADIOGRAPHING TRANSITION TABLE

| ABDOMEN |
| FRONT OF CHEST |
| RIGHT SIDE OF CHEST |
| ⋮ |
| FRONT OF CERVICAL VERTEBRA |
| FRONT OF HEAD |

RADIOGRAPHED-SITE TRANSITION DIAGRAM

L1　　　　　L2　　　L3 L4
　　MEDIASTINAL　LUNG　　DIRECT
　　　REGION　　 FIELD EXPOSURE
　　　　　　　　REGION　REGION

L1　　　　　L2　　　L3 L4
　　MEDIASTINAL　LUNG　　DIRECT
　　　REGION　　 FIELD EXPOSURE
　　　　　　　　REGION　REGION

X-RAY IMAGE PROCESSING APPARATUS AND METHOD

BACKGROUND OF THE INVENTION

1. Field of the Invention

The present invention relates to an X-ray image processing apparatus and method for performing image processing on radiographed X-ray images.

2. Description of the Related Art

Hitherto, an X-ray digital still image radiographing system using a flat panel detector (FPD) or a photo-stimulable phosphor determines an image processing parameter by analyzing a radiographed image. Then, image processing is performed using the image processing parameter. Thus, an optimal X-ray digital image for diagnosis is generated.

FIG. 10 illustrates a chest image that can be roughly segmented into a lung field region, a mediastinal region, and direct exposure regions outside a subject. Generally, the most important part for diagnosis of the chest image is the lung field region. The chest image whose lung field region has high contrast is required. The mediastinal region of the chest image does not need to have contrast as high as that of the lung field region. However, the chest image of the mediastinal region needs to have contrast which is not reduced to low levels and which can clearly be seen in detail. In order to obtain a chest image which satisfies such requirements, a segmentation process which analyzes an image and segments an entire image into a lung field region, a mediastinal region, and direct exposure regions is performed on the chest image.

One type of the segmentation process is a method using a histogram. When a histogram of the chest image illustrated in FIG. 10 is obtained, the histogram can be divided into three segments each having a peak which respectively correspond to the lung field region, the mediastinal region, and the direct exposure regions, as illustrated in FIG. 11A. Then, a range of pixel values (L1 through L2) corresponding to the mediastinal region, a range of pixel values (L2 through L3) corresponding to the lung field region, and a range of pixel values (L3 through L4) corresponding to the direct exposure regions can be obtained by extracting peaks and valleys in the histogram.

First, a binary image is created according to data in the range of pixel values (L1 through L2) corresponding to the mediastinal region of the chest image by performing a thresholding process in which as to pixels within the range of the pixel values (L1 through L2) of the mediastinal region of the chest image, a bit is "on", and as to the pixels out of the range of the pixel values (L1 through L2), a bit is "off". Further, in order to delete noise from the binary image, expansion/contraction processing which is general-purpose binary image processing is repeated. Consequently, a plurality of connected regions can be extracted. In addition, a region whose position and size are most appropriate to those of the mediastinal region can be selected from the plurality of connected regions by preliminarily obtaining statistics, such as average values and standard deviates of the position and the size of the mediastinal region in the chest image.

Similarly, the lung field region and the direct exposure regions can be determined, and the chest image can be segmented into the regions. Then, based on a result of region segmentation, which range the pixel values are included in can be determined with higher accuracy for each region. Thus, the range of pixel values (L1 through L2) corresponding to the mediastinal region, the range of pixel values (L2 through L3) corresponding to the lung field region, and the range of pixels values (L3 through L4) corresponding to the direct exposure regions are newly determined. Then, image processing is further performed on the basis of the newly determined ranges of pixel values of these regions, and a diagnostic image is obtained.

In order to obtain the diagnostic image, it is necessary to convert the contrast of the image. Thus, e.g., a pixel value conversion is performed in the image processing by performing gradation conversion using a lookup table. In the chest image, the range of pixel values (L1 through L4) of the entire image is expanded to a range of all pixel values, as illustrated in FIG. 11B. A pixel value conversion lookup table is generated so that the lung field region has a high gradient (high contrast), and a mediastinal region has a low gradient (low contrast). By performing the pixel value conversion using the lookup table, gradation of the chest image can be converted to have high contrast in the lung field without degrading the contrast of the mediastinal region. Further, in order to obtain detailed diagnostic information on the mediastinal region, low contrast is compensated by supplementing an image of the mediastinal region with high frequency components. How much the high frequency components are supplemented into the image of the mediastinal region is determined from the gradient in the pixel value of the mediastinal region in the lookup table.

Thus, a chest image suitable for image diagnosis of the chest is obtained by analyzing a radiographed image of the chest and performing image processing using information about the ranges of pixel values of the lung field region, the mediastinal region, and the direct exposure regions and information about the mediastinal region as image processing parameters.

Such image analysis is performed not only on a chest image. Various types of analysis may be performed on all sites, such as a skull region, a cervical vertebra region, a lumbar vertebra region, an abdominal region, a pelvis region, an articulation coxae region, and four limb regions, to obtain images more suitable for diagnosis. For example, Japanese Patent Application Laid-Open No. 11-151232 discusses extraction of a lung field region. Japanese Patent Application Laid-Open No. 2000-101840 discusses generation of a histogram, which is performed by deleting direct exposure regions. Japanese Patent Application Laid-Open No. 2000-163562 discusses extraction of a throat region.

Further, Japanese Patent Application Laid-Open No. 2002-282244 discusses extraction of a bone region. Japanese Patent Application Laid-Open No. 2002-330953 discusses deletion of a metal or radiation shielding material region. Japanese Patent Application Laid-Open No. 2003-16449 discusses techniques for performing analysis and image processing on an X-ray digital image to determine whether a direct exposure region is present.

Thus, algorithms for various types of analysis have been developed to improve the accuracy of the image. A dedicated analyzing program is used to analyze an image of each of the sites. The analyzing program is switched to the dedicated analyzing program corresponding to the radiographed site for every radiographing.

In a case of a still image radiographing system, site information about a site to be radiographed can be preliminarily obtained by the above techniques, e.g., an operator pushes a "site button" corresponding to the site to be radiographed before the site is radiographed. The site information is extremely important for analyzing a radiographed X-ray digital image. First, structure information indicating how many regions roughly constitute the radiographed image can be obtained from the site information. For example, a chest image can be roughly segmented into a lung field region, a mediastinal region, and direct exposure regions outside a subject. Therefore, it is extremely difficult to perform region segmentation processing without the site information. Further, if there is no information about a number of peaks to segment the histogram when peaks and valleys are extracted from a histogram, the system needs to segment the histogram by each of all possible numbers. Then, the system has to select a case where the degree of separation among regions respectively having peaks is highest. Thus, a huge amount of calculation is needed. In addition, results of calculation are low in precision and unstable.

Second, image processing method information indicating how an image is to be processed can be obtained from the site information. In the case of processing a chest image, it is necessary to set the contrast of the lung field region high and to obtain detail information about the mediastinal region. Thus, the pixel value conversion lookup table is generated from respective ranges of pixel values of the lung field region, the mediastinal region, and the direct exposure regions. Then, pixel value conversion by gradation conversion is performed using the lookup table. Subsequently, a process for supplementing the mediastinal region, which is obtained by the region segmentation process, with high frequency components in quantity determined according to a gradient in the pixel value of the mediastinal region in the lookup table is performed. Thus, if optimal image processing is performed on each of the sites, an image with an extremely high diagnostic value can be generated, as compared with an image which is uniformly processed without the site information.

However, a moving image radiographing system does not analyze an image using the site information. This is because a moving image of a subject is not radiographed by fixing a specific site of the subject. Since the moving image is radiographed while a radiographing direction and a radiographing position are continuously changed, site information corresponding only to the specific site is not enough to perform an analysis of the moving image, and continuous site information is needed therefor. Thus, an indefinitely large number of the site information is needed to analyze the moving image. However, it is impossible to use the indefinitely large number of site information. Accordingly, the moving image radiographing system does not perform high precision analysis and image processing using the site information.

One of main features of the moving image radiographing system is that X-ray exposure needs to be continuously controlled while a moving image is radiographed. The X-ray exposure can be controlled with good precision by an X-ray control parameter therefor which is obtained by utilizing results of high-precision analysis using the site information.

However, the high-precision analysis using the site information is not performed for the above-described reasons. Image processing and X-ray exposure control are performed by simplified methods. The simplified methods assume that a central portion of an image to be analyzed is a most-intended target site of observation. Upon this assumption, an area of interest is set in the central portion of the image. The image processing parameter and the X-ray control parameter are determined according only to information obtained in the area of interest. Then, image processing and X-ray exposure control are performed using these parameters.

For example, an average pixel value of the area of interest is calculated. Then, a pixel value conversion lookup table is created so that the average pixel value of the area of interest represents a constant luminance at all times. Subsequently, pixel value conversion using gradation conversion is performed.

Further, the average pixel value is used as an index value of an X-ray exposed dose of a patient who is a radiographed subject. X-ray radiographing conditions for an X-ray tube voltage and an X-ray tube current are controlled so that the average pixel value is to be a predetermined value.

However, according to the above-described moving image radiographing method, regardless of what subject is present at the central portion of an image, when a substance which is poor in X-ray permeability, e.g., an artificial bone is present at the central portion of the image, there are fears that necessary parts of the image may be unclearly displayed as a result of higher gradation conversion, and that excessive X-ray exposure may occur. That is, because the moving image radiographing system cannot use important site information, only poor precision and inaccurate image processing parameters and X-ray control parameters are obtained by the simplified methods. Accordingly, the conventional moving image radiographing method has a problem that a user thereof cannot obtain a desired radiographed image, i.e., a moving image effective for diagnosis.

SUMMARY OF THE INVENTION

The present invention is directed to an X-ray moving image processing apparatus that can obtain an image with a highly diagnostic value.

According to an aspect of the present invention, an X-ray image processing apparatus includes a site information determination unit configured to determine, based on discrete site information, continuous site information to be obtained by radiographing a moving image, an information acquisition unit configured to extract, from the discrete site information, image construction information, image processing method information, and X-ray exposure control method information, a computation unit configured to compute processing information about a site located between positions represented by the discrete site information using the information extracted by the information acquisition unit, an image processing unit configured to perform image processing based on the processing information which is computed by the computation unit, and an X-ray exposure control unit configured to perform X-ray exposure based on the processing information which is computed by the computation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
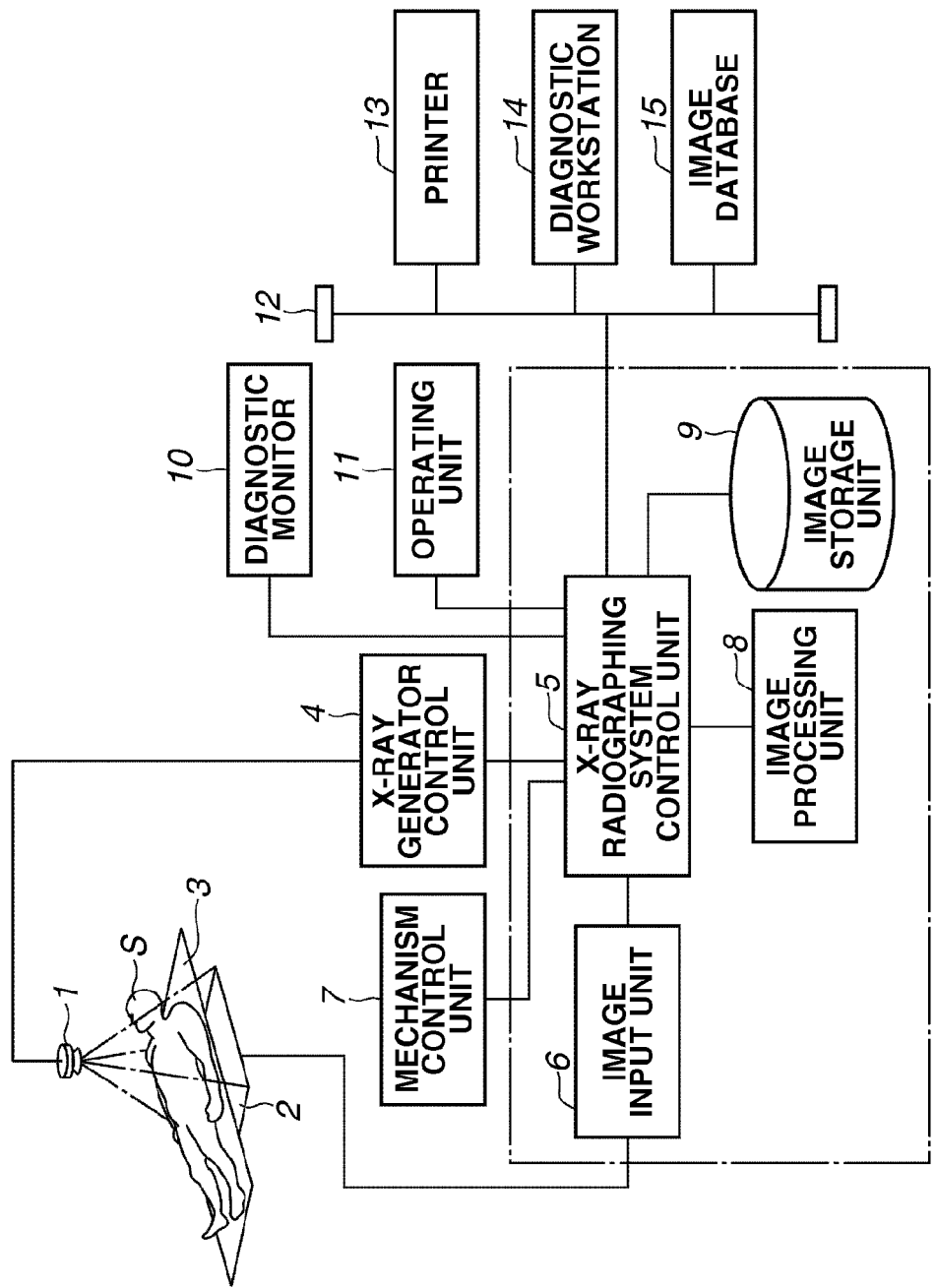
FIG. 1 illustrates a configuration of an X-ray moving image radiographing system according to an exemplary embodiment of the present invention.

FIG. 1 illustrates a configuration of an X-ray moving image radiographing system according to an exemplary embodiment of the present invention. As illustrated in FIG. 1, an X-ray source 1 for generating X-rays and an X-ray detector 2 for detecting an X-ray generated from the X-ray source 1 are arranged to face each other. A table 3 on which a subject S is placed is arranged between the X-ray source 1 and the X-ray detector 2.

An X-ray radiographing system control unit 5 is connected to the X-ray source 1 via an X-ray generator control unit 4 for controlling generation of an X-ray. The X-ray detector 2 is connected to the X-ray radiographing system control unit 5 via an image input unit 6.

A mechanism control unit 7 for controlling a mechanism, an image processing unit 8 for performing image processing, an image storage unit 9 for storing an image, a diagnostic monitor 10 for displaying an image, and an operating unit 11 for performing various operations are connected to the X-ray radiographing system control unit 5. Further, an external printer 13, a diagnostic workstation 14, and an image database 15 are connected to the X-ray radiographing system control unit 5 via a network 12.

X-rays generated from the X-ray source 1 that is controlled by the X-ray generator control unit 4 are transmitted through the subject S and are detected by the X-ray detector 2. The detected X-rays are input to the X-ray radiographing system control unit 5 as image data via the image input unit 6. The image data is subjected to image processing, e.g., correction of data obtained by the X-ray detector 2, preprocessing including logarithmic conversion, noise removal, image quality enhancement processing such as sharpening and dynamic range compression, and image analysis processing, which are performed in the image processing unit 8. Then, the image subjected to such image processing is displayed on the diagnostic monitor 10.

The X-ray radiographing system control unit 5 sends an X-ray exposure control parameter which is obtained as a result of the image analysis processing by the image processing unit 8 to the X-ray generator control unit 4. The X-ray generator control unit 4 determines X-ray exposure conditions corresponding to a radiographed site and performs X-ray exposure based on the X-ray exposure control parameter. A moving image radiographing is performed by repeating this process. Thus, time-series images are obtained and are continuously displayed.

Figure 2:
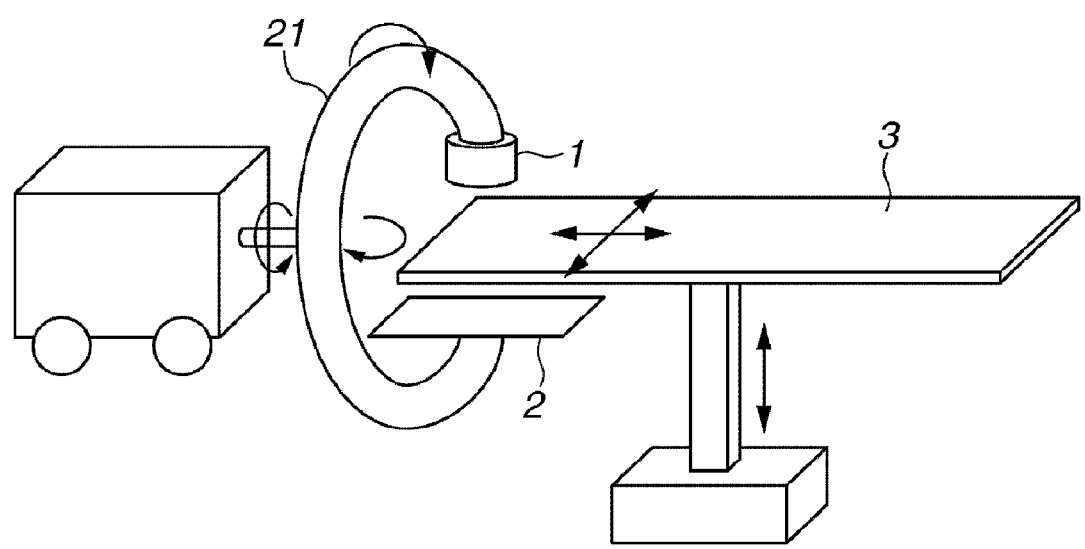
FIG. 2 illustrates a configuration of a retaining mechanism for retaining an X-ray source and an X-ray detector.

FIG. 2 illustrates a configuration of a retaining mechanism for retaining the X-ray source 1 and the X-ray detector 2. The X-ray source 1 and the X-ray detector 2 are fixed to both ends of a C-arm 21. The C-arm 21 can rotate in three directions indicated by arrows. In addition, the table 3 can move in three directions, i.e., an anteroposterior direction, a lateral direction, and a vertical direction, as indicated by arrows, interlockingly with the C-arm 21.

The table 3 and the C-arm 21 are controlled by the mechanism control unit 7 connected thereto. Thus, an image of the subject S can be obtained from an optional direction at a given position. Time-series images of the subject S obtained in this way are stored in the image storage unit 9 and output to the printer 13, the diagnostic workstation 14, and the image database 15 via the network 12. The present embodiment obtains an image processing parameter and an X-ray exposure control parameter, while information about the radiographed site is obtained. Then, the present embodiment performs image processing and X-ray exposure control processing using these parameters.

Figure 3:
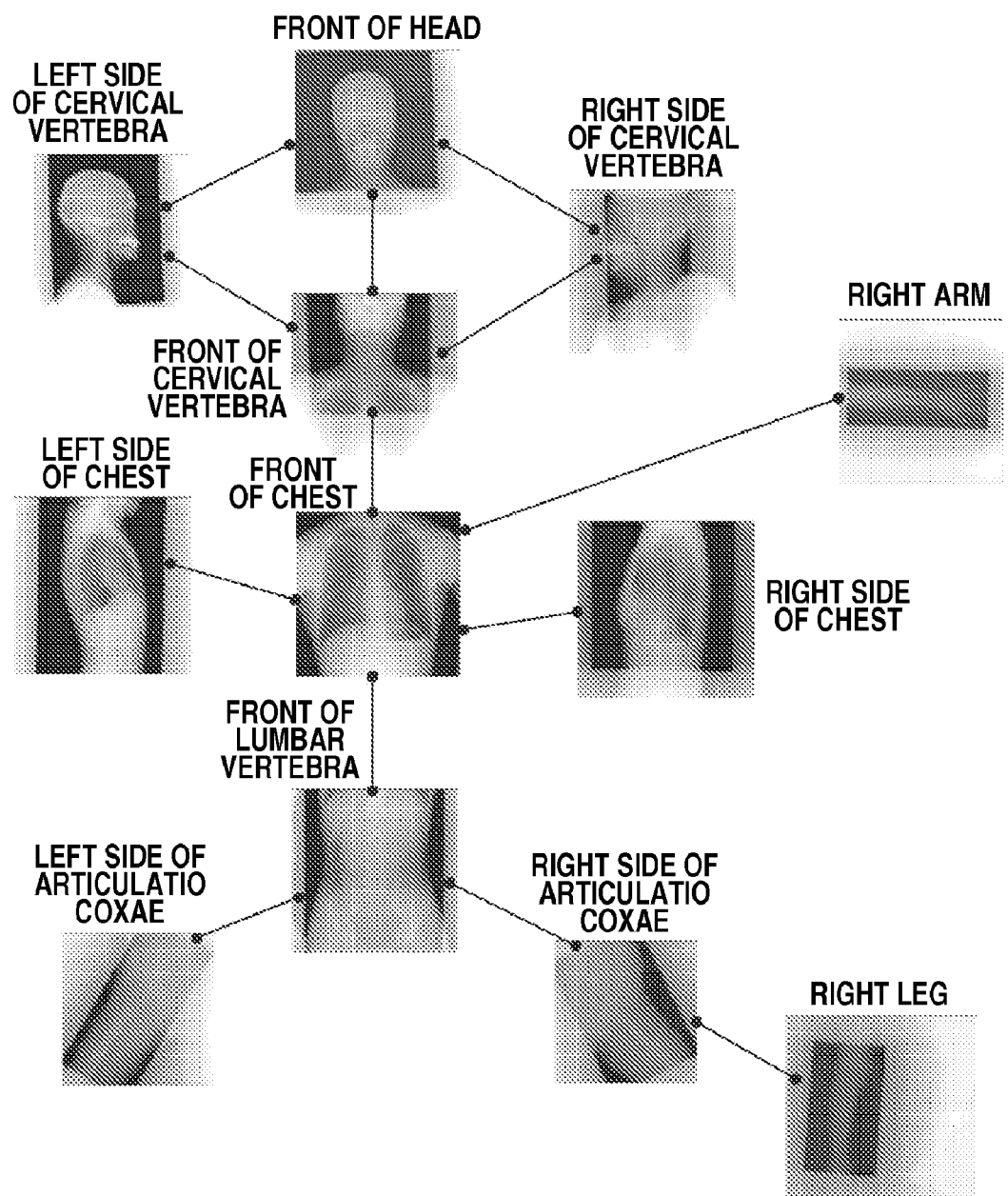
FIG. 3 illustrates a radiographing site transition diagram.

FIG. 3 illustrates a radiographing site transition diagram. Representative patterns respectively corresponding to a plurality of representative radiographing sites are connected to each other by a path along which transition of the representative patterns can be performed when a radiographing direction and a radiographing position are changed during radiographing the subject. Hereinafter, a representative pattern corresponding to a radiographing site is referred to as a site pattern. A path along which site patterns are transitionable is referred to as a site path. Although site information is not illustrated in this radiographing site transition diagram, the site information is linked with the site pattern. Thus, site information corresponding to each of the time-series images which are input during the moving image radiographing can be acquired.

The radiographing site of each of the time-series images which are input during the moving image radiographing is continuously changed. Further, the site patterns in the radiographing site transition diagram are discrete. Thus, the site pattern which completely matches with the radiographed site of the time-series image is not always found. Accordingly, two site patterns which are "nearest" to the radiographed site and a position on the site path between these two site patterns are comprehensively used as data that correspond to the site of each of times-series images in the moving image radiographing. These two sites are referred to as "moving image radiographing sites".

Figure 4:
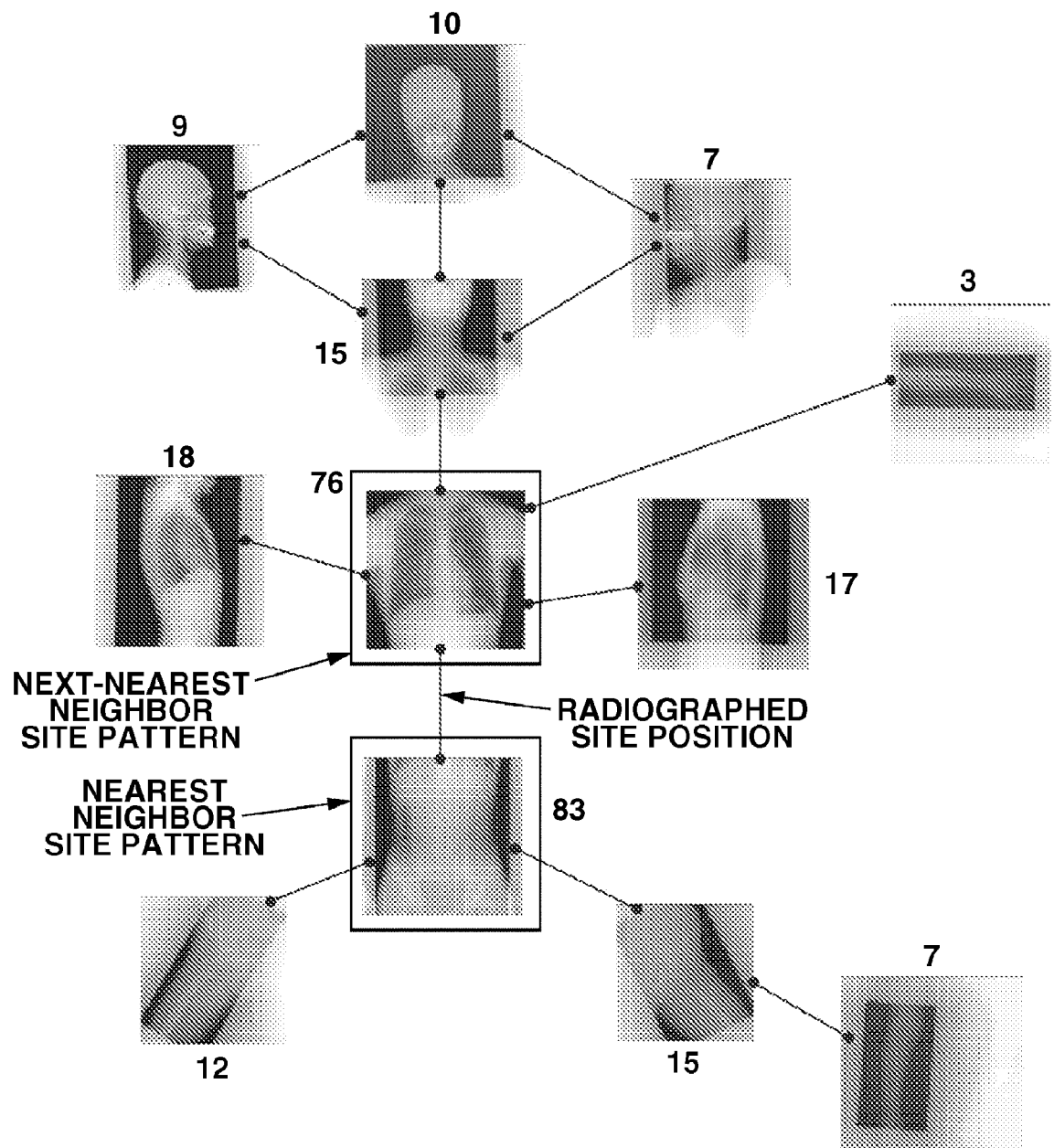
FIG. 4 illustrates calculated degrees of similarity of moving image radiographing sites.

FIG. 4 illustrates calculated degrees of similarity of the moving image radiographing sites by numerical values. Regarding two site patterns that are "nearest" to a radiographed site, first, a site pattern which is most similar to a radiographed image is found in the radiographing site transition diagram illustrated in FIG. 3. The found site pattern is set to be a nearest neighbor site pattern. In order to find the most similar site pattern, the degree of similarity between the radiographed image and each of all the site patterns shown in FIG. 3 is calculated. Then, the site pattern having the highest degree of similarity is set to be the most similar site pattern. A template matching method, a feature matching method, and a subspace method can be used for calculating the degree of similarity. The following actual data representing the site patterns shown in the radiographing site transition diagram are used. That is, an average image, a feature vector, and a subspace are used as the actual data in the template matching method, the feature matching method, and the subspace method respectively.

When the nearest neighbor site pattern is found, the site pattern which is most similar to the radiographed image is obtained among the site patterns connected to the nearest neighbor site via the site path other than the nearest neighbor site pattern. The obtained site pattern is set to be a next-nearest neighbor pattern. The nearest neighbor site pattern and the next-nearest neighbor site pattern are set to be the site patterns that are "nearest" to the radiographed site. When the site patterns which are "nearest" to the radiographed site are determined in this way, the radiographing site position on the site path between the two site patterns is determined.

Figure 5:
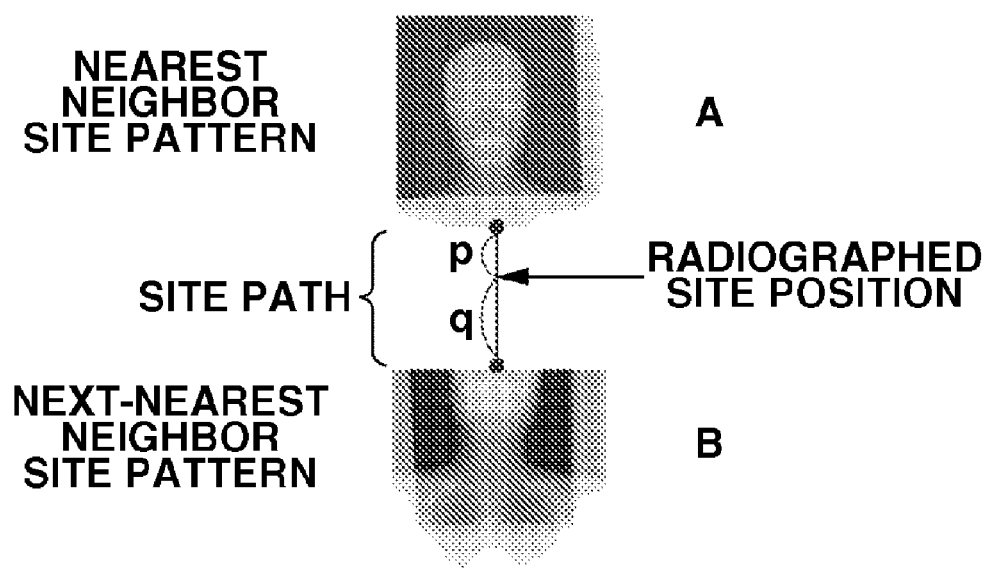
FIG. 5 illustrates calculation of the degree of similarity of a radiographed site.

As illustrated in FIG. 5, the radiographing site position is determined using the degree of similarity as a weighting coefficient, in which the higher the degree of similarity, the closer to the radiographed site the corresponding site pattern is positioned. For example, the degree of similarity corresponding to a site pattern "A" is designated with "p". The degree of similarity corresponding to a site pattern "B" is designated with "q". The distance between the site patterns A and B (i.e., the length of the site path) is assumed to be 1. Then, a position located at a distance of q/(p+q) from the site pattern A is determined to be the radiographed site position. Thus, the two site patterns which are "nearest" to the radiographed site, and the radiographed site position, i.e., the moving image radiographing sites can be obtained.

Next, image construction information, image processing information, and X-ray exposure control information are obtained from the moving image radiographing sites. The image construction information indicates a structure of an image, more particularly, how many regions the image is roughly divided into, and what regions constitute the image. The image processing information represents what image processing (e.g., a gradation process and a high-frequency supplementing process) the system performs. For example, in the case of performing the gradation process, the image processing information indicates a region on which the gradation process is performed and a value (%) of contrast to be set at the region. In the case of performing the high-frequency supplementing process, the image processing information indicates which region a high-frequency component is supplemented into. The X-ray exposure control information indicates how X-ray exposure is controlled. The X-ray exposure control information indicates, e.g., which region is controlled to make an average pixel value constant and what value is set thereto.

Figure 6:
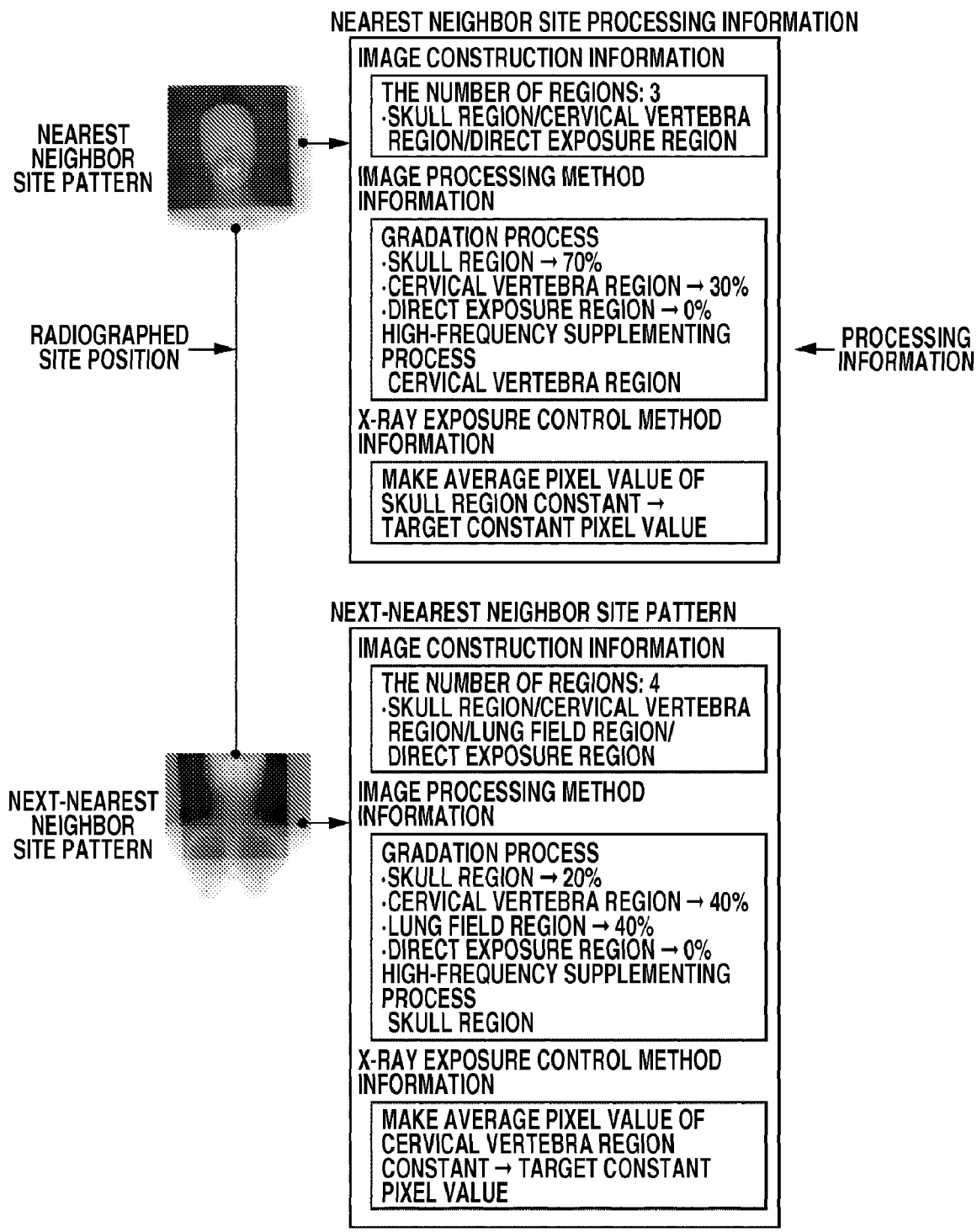
FIG. 6 illustrates a method for generating processing information.

The moving image radiographing site includes two site patterns, each of which is linked with one type of processing information. Then, one type of processing information is derived from the two types of processing information which are linked with the two site patterns. A simplest method is to use the processing information linked with the nearest neighbor site pattern, as illustrated in FIG. 6, as processing information corresponding to the moving image radiographing site without change.

Figure 7:
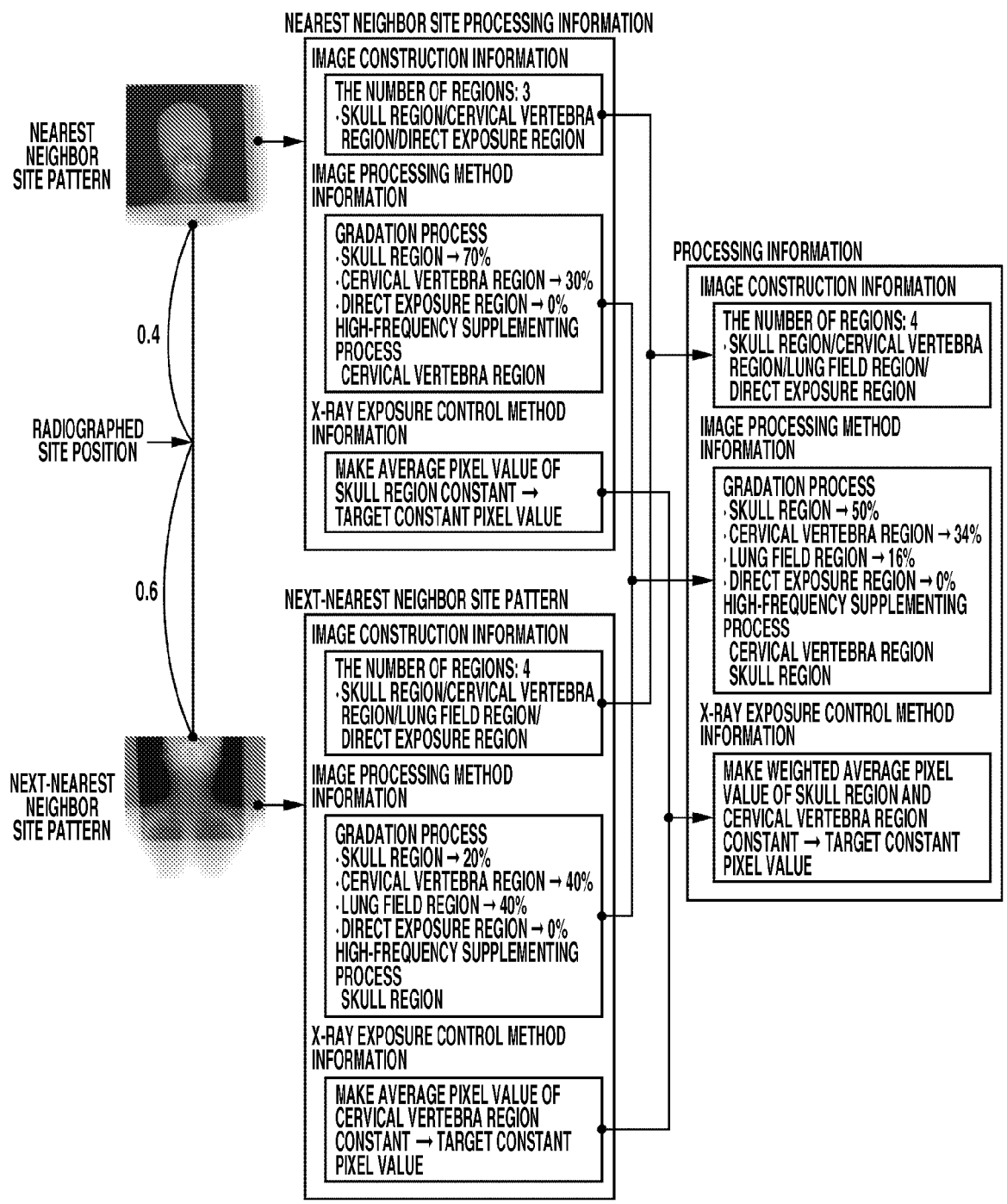
FIG. 7 illustrates another method for generating processing information.

FIG. 7 illustrates a method for generating processing information utilizing the radiographing site position. The processing information is generated from those of the nearest neighbor site and the next-nearest neighbor site using a reciprocal number of the distance between the radiographing site position and each of the nearest neighbor site and the next-nearest neighbor site as a weighting coefficient. For example, in the gradation process, according to the nearest neighbor site processing information, the value of the contrast assigned to a skull region, a cervical vertebra region, and direct exposure regions may be 70%, 30%, and 0% respectively. According to the next-nearest neighbor site processing information, the value of the contrast assigned to the skull region, the cervical vertebra region, a lung field region, and the direct exposure regions may be 20%, 40%, 40%, and 0% respectively.

The contrast may be assigned by setting the weighting coefficient corresponding to the nearest neighbor site and that corresponding to the next-nearest neighbor site. For example, suppose that the distance of the nearest neighbor site to the radiographed position is 0.4 and that the distance of the next-nearest neighbor site to the radiographed position is 0.6. Then, the value of the contrast assigned to the skull region, the cervical vertebra region, the lung field region, and the direct exposure regions become 50%, 34%, 16%, and 0% respectively.

The X-ray exposure control is performed so that the average pixel value of the skull region is made to be constant according to the nearest site processing information, and that the average pixel value of the cervical vertebra region is made to be constant according to the next-nearest site processing information. For example, according to the above example, X-ray exposure may be controlled so that a value obtained by adding 0.6 to the average pixel value of the skull region and a value obtained by adding 0.4 to the average pixel value of the cervical vertebra using the weighting coefficient, as above-described, are made to be constant. Regarding information whose weighted average value cannot be calculated such as the number of regions and a region into which a high-frequency component is supplemented, information including processing information of both of the regions is used.

Thus, the site information can be determined by obtaining the moving image radiographing site position from the radiographing site transition diagram. Consequently, computation is performed on the image processing information of the site to be radiographed which is located between the sites having the values of the discrete site information. Then, image processing and X-ray exposure control processing are performed based on the radiographing site information included in the computed image processing information.

Selection of the representative radiographing site pattern in the radiographing of a moving image is important for creating the radiographing site transition diagram. One method for selecting the representative radiographing site is to use the radiographing site pattern used in the radiographing of a still image as the representative site pattern, without change, as illustrated in FIG. 3. Another method is to use the site to be radiographed by setting a radiographing position and a radiographing direction so that a position at which at least one type of processing information is changed, (e.g., a position at which the value of the contrast of the region is increased or decreased), or so that a position at which the region to be used for controlling X-ray exposure is changed, is a middle point.

Figure 8A:
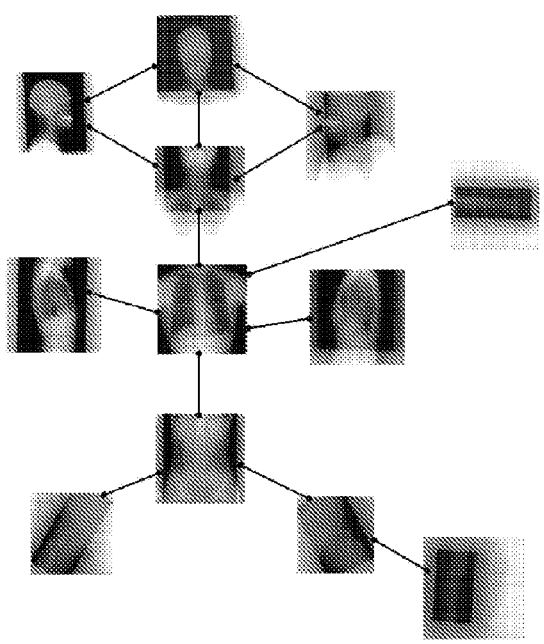
FIGS. 8A through 8D illustrate radiographing site transition diagrams corresponding to respective radiographing sites.
Figure 8B:
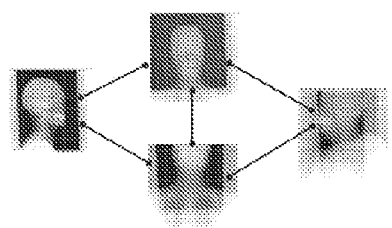
Figure 8C:
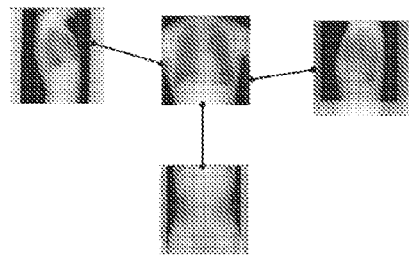
Figure 8D:
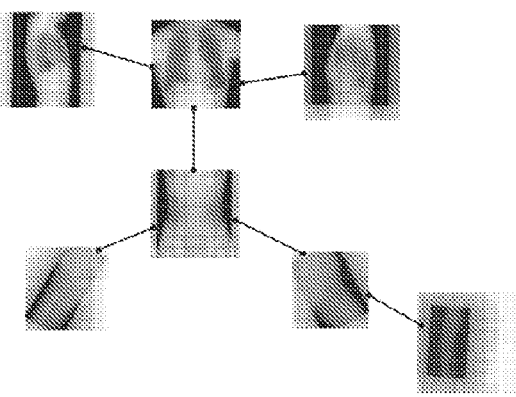

In X-ray moving image radiographing, a range to be radiographed is varied with tests. Thus, as illustrated in FIGS. 8A through 8D, it is efficient to create a radiographing site transition diagram corresponding to each test. FIG. 8A illustrates the transition diagram for radiographing a whole body. FIG. 8B illustrates the transition diagram for radiographing a head. FIG. 8C illustrates the transition diagram for radiographing a thoracoabdominal region. FIG. 8D illustrates the transition diagram for radiographing a lower body.

Figure 9:
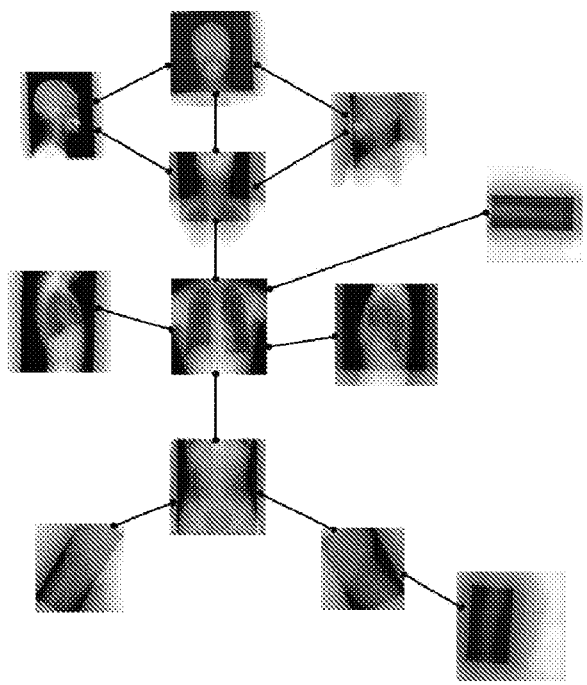
FIG. 9 illustrates a radiographing transition table and a radiographing site transition diagram.
Figure 10:
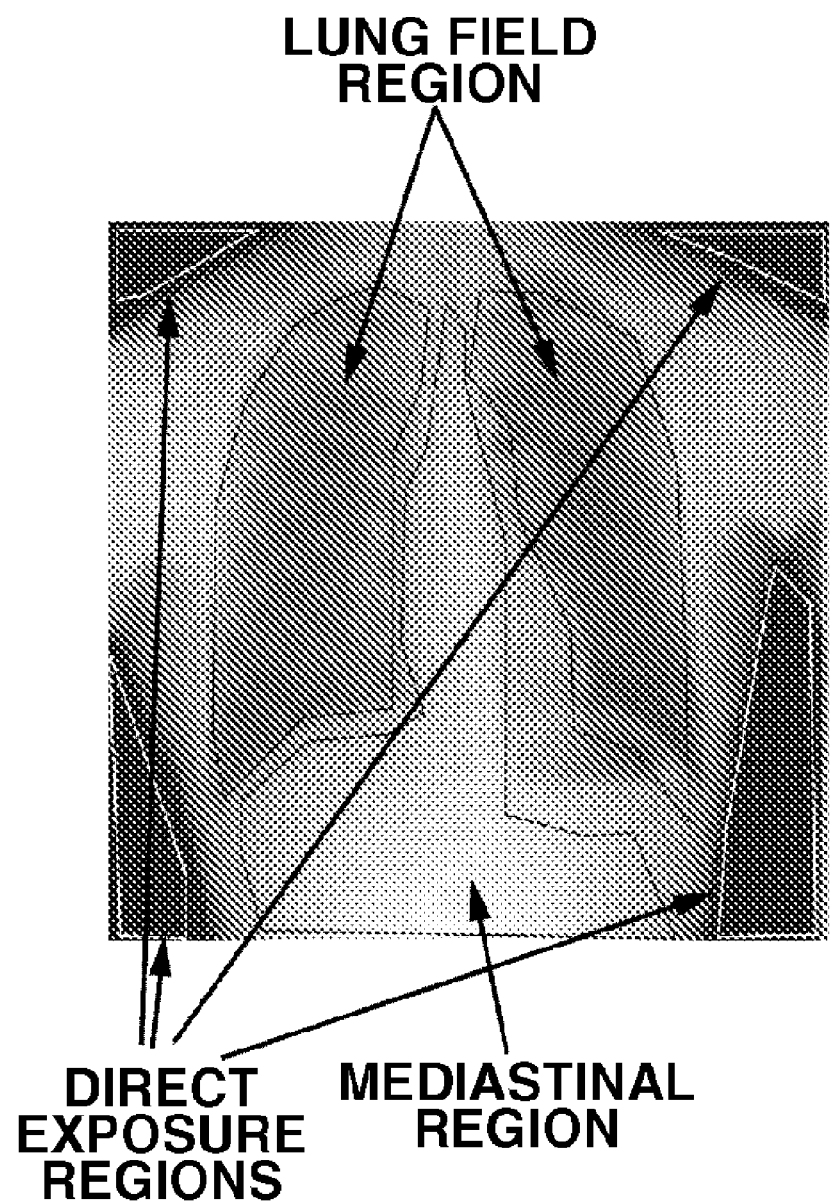
FIG. 10 illustrates a front of a still chest image.
Figure 11A:
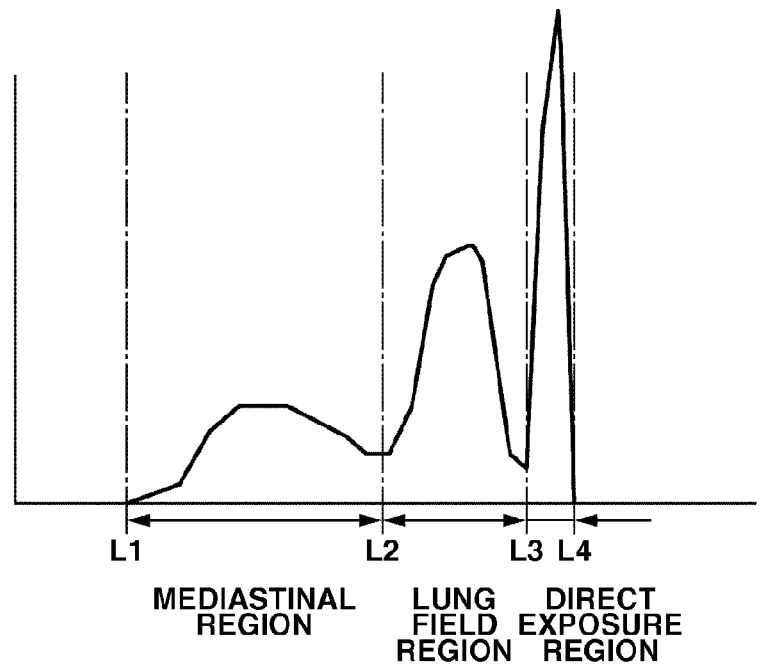
FIGS. 11A and 11B illustrate histograms of still chest images.
Figure 11B:
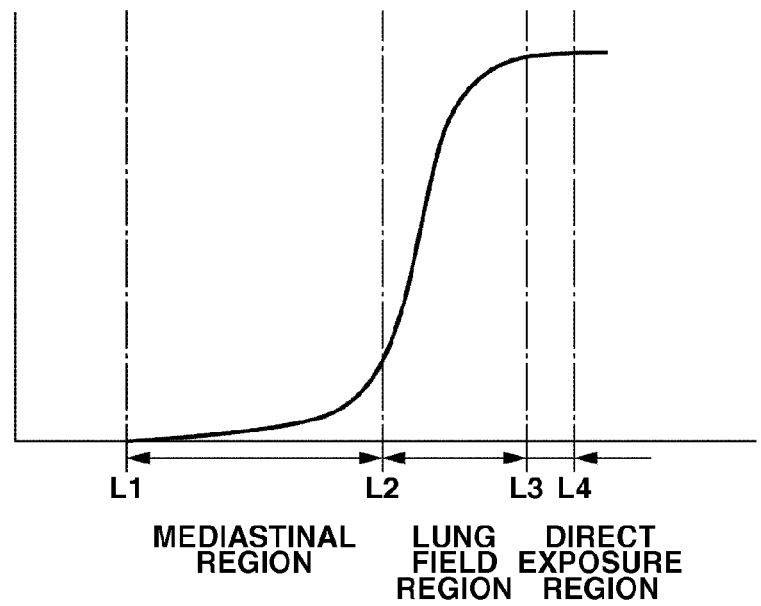

Additionally, as illustrated in FIG. 9 for example, the site patterns can be efficiently obtained with high accuracy by using a radiographing transition table together with the radiographing site transition diagram. The radiographing transition table is obtained by listing site patterns in a typical order of transition of a moving image radiographing in a test. The radiographing transition table is created and stored at each test, together with the radiographing site transition diagram.

When a moving image is radiographed, it is specified which test is now performed. Then, the radiographing site transition diagram and the radiographing transition table which correspond to the specified test are read. When the radiographing of a moving image is started, a first image is input. The radiographing transition table is utilized for deducing the nearest neighbor site of the first image. A first site pattern for the test is extracted from the radiographing transition table.

Then, the site pattern is extracted from the radiographing site transition diagram. Subsequently, the degree of similarity between the site pattern and the radiographed image is calculated. When the calculated degree of similarity is equal to or more than a predetermined threshold, the site pattern is set as the nearest neighbor site pattern. On the other hand, when the calculated degree of similarity does not exceed the predetermined threshold, the degree of similarity between the radiographed image and each of all the site patterns included in the radiographing site transition diagram is calculated. Thus, the site pattern having the highest degree of similarity is set as the nearest neighbor site pattern.

Similar to the above, the next-nearest neighbor site pattern is set by calculating the degree of similarity between the radiographed image and each of sites provided therearound. The above-described process is repeated for the next and subsequent images. However, when the degree of similarity of the site pattern stored in the radiographing transition table does not exceed the threshold, a current position in the radiographing transition table is updated according to the site pattern obtained from the actual degree of similarity.

When an image is radiographed according to a typical radiographing method for a test by utilizing a method using the radiographing transition table, the degree of similarity of the site pattern which is stored in the radiographing transition table exceeds the threshold. Thus, it is unnecessary to calculate the degree of similarity between the radiographed image and each of all the patterns stored in the radiographing site transition diagram. Accordingly, the nearest neighbor site pattern can be obtained very efficiently.

When a moving image is radiographed in the moving image radiographing system, the moving image radiographing site patterns in the radiographing site transition diagram are obtained for each input image. The moving image radiographing site patterns of each input image are stored. The stored moving image radiographing site patterns are collected by each test. By performing learning processing, the moving image radiographing site patterns can be presumed with higher accuracy.

Sometimes, a still image is radiographed during a moving image radiographing. At that time, analysis processing is performed on a still image corresponding to a present nearest neighbor site so as to obtain a still image diagnostic image processing parameter. Then, still image diagnostic image processing is performed using the obtained still image diagnostic image processing parameter.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-043778 filed Feb. 26, 2008, which is hereby incorporated by reference herein in its entirety.

What is claimed is:

1. An X-ray image processing apparatus comprising:
  a site information determination unit configured to determine, based on discrete site information, continuous site information to be obtained by radiographing a moving image;
  an information acquisition unit configured to extract, from the discrete site information, image construction information, image processing method information, and X-ray exposure control method information;
  a computation unit configured to compute processing information about a site located between positions represented by the discrete site information using the information extracted by the information acquisition unit;
  an image processing unit configured to perform image processing based on the processing information which is computed by the computation unit; and
  an X-ray exposure control unit configured to perform X-ray exposure based on the processing information which is computed by the computation unit.

2. The X-ray image processing apparatus according to claim 1, wherein the site information determination unit links site information about representative radiographing sites which is obtained by radiographing the moving image to determine the continuous site information with the information extracted by the information acquisition unit, and wherein the site information determination unit determines radiographing site information about a respective image of each of a plurality of site patterns, which image is input by radiographing the moving image by using a radiographing site transition diagram which is connected by a site path.

3. The X-ray image processing apparatus according to claim 2, wherein the site information about the representative radiographing site is an average image, a feature vector, or a subspace.

4. The X-ray image processing apparatus according to claim 2, wherein the site information determination unit calculates a degree of similarity between the image of the site pattern and the site pattern included in the radiographing site transition diagram and determines the radiographing site information by determining a nearest neighbor site, a next-nearest neighbor site, and a radiographing site position based on the calculated degree of similarity.

5. The X-ray image processing apparatus according to claim 2, wherein the site information determination unit stores the radiographing site information obtained from the radiographing site transition diagram corresponding to each image input when the moving image is radiographed and performs learning processing by collecting the photographing site information corresponding to each of the images stored at each test.

6. A radiation image processing apparatus that performs image processing on a radiation image which is acquired by radiographing radiation that transmits through a subject, the radiation image processing apparatus comprising:
  a first setting unit configured to set an image processing parameter corresponding to each of a plurality of sites of the subject;
  a selection unit configured to select a site based on a degree of similarity between a radiographed site of the subject and at least one of the plurality of sites; and
  a second setting unit configured to set an image processing parameter corresponding to the radiographed site based on the site selected by the selection unit.

7. A non-transitory computer-readable medium storing a computer program of instructions which cause a computer to perform a method comprising:
  determining, based on discrete site information, continuous site information which is obtained by radiographing a moving image;
  extracting from the discrete site information image construction information, image processing method information, and X-ray exposure control method information;
  computing processing information about a site located between positions represented by the discrete site information using the extracted image construction information, the extracted image processing method information, and the X-ray exposure control method information; and
  performing image processing and X-ray exposure based on the computed processing information.

* * * * *